United States Patent
McCourt et al.

(10) Patent No.: US 10,891,212 B2
(45) Date of Patent: Jan. 12, 2021

(54) IDENTIFYING FUNCTIONS PRONE TO LOGIC ERRORS IN BINARY SOFTWARE COMPONENTS

(71) Applicant: BlackBerry Limited, Waterloo (CA)

(72) Inventors: William James McCourt, Maidenhead (GB); Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 115 days.

(21) Appl. No.: 16/166,649

(22) Filed: Oct. 22, 2018

(65) Prior Publication Data

US 2019/0121718 A1 Apr. 25, 2019

Related U.S. Application Data

(60) Provisional application No. 62/575,989, filed on Oct. 23, 2017.

(51) Int. Cl.
*G06F 11/00* (2006.01)
*G06F 11/36* (2006.01)

(52) U.S. Cl.
CPC ...... *G06F 11/3616* (2013.01); *G06F 11/3604* (2013.01); *G06F 2201/81* (2013.01)

(58) Field of Classification Search
CPC .... G06F 11/3616; G06F 11/3604; G06F 8/75; G06F 2201/81
See application file for complete search history.

(56) References Cited

U.S. PATENT DOCUMENTS

| | | | |
|---|---|---|---|
| 6,651,244 B1 * | 11/2003 | Smith | G06F 8/75 714/38.1 |
| 8,479,161 B2 | 7/2013 | Weigert | |
| 10,162,729 B1 * | 12/2018 | Snyder | G06F 40/205 |
| 2004/0010703 A1 | 1/2004 | Kouznetsov et al. | |
| 2004/0040014 A1 * | 2/2004 | Ball | G06F 11/3616 717/130 |
| 2008/0016412 A1 * | 1/2008 | White | G06F 11/3409 714/48 |
| 2008/0320457 A1 | 12/2008 | King et al. | |
| 2012/0072968 A1 | 3/2012 | Wysopal et al. | |
| 2016/0162387 A1 * | 6/2016 | Arguelles | G06F 11/3676 717/125 |

OTHER PUBLICATIONS

International Search Report and Written Opinion issued in PCT/EP2018/079070 dated Feb. 1, 2019; 12 pages.

(Continued)

*Primary Examiner* — Joseph D Manoskey
(74) *Attorney, Agent, or Firm* — Fish & Richardson P.C.

(57) ABSTRACT

Systems, methods, and software can be used to identify functions prone to logic errors in software components using binary static analysis. In some aspects, one computer-implemented method includes identifying a function defined within a binary software component; determining one or more complexity characteristics of the function based on included instructions; determining, based on the complexity characteristics, whether the function is likely to produce errors when the instructions included in the function are executed by a processor; and in response to determining that the function is likely to contain errors, generating an indication that the function requires further review.

17 Claims, 3 Drawing Sheets

(56) References Cited

OTHER PUBLICATIONS

Panas et al., "Techniques for software quality analysis of binaries," Defects in Large Software Systems, ACM, Jun. 19, 2009, 5 pages.
Thirumalesh et al., "Building Scalable Failure-proneness Models Using Complexity Metrics for Large Scale Software Systems," Software Engineering Conference, 2006, APSEC 2006, 13th Asia Pacific, Dec. 1, 2006, 6 pages.

* cited by examiner

IDENTIFYING FUNCTIONS PRONE TO LOGIC ERRORS IN BINARY SOFTWARE COMPONENTS

CROSS REFERENCE TO RELATED APPLICATIONS

This application claims the benefit of priority of U.S. Application Ser. No. 62/575,989, filed on Oct. 23, 2017, which is incorporated by reference herein in its entirety.

TECHNICAL FIELD

The present disclosure relates to identifying functions prone to logic errors in binary software components using binary static analysis.

BACKGROUND

Binary static analysis involves examination of a compiled or binary representation of a software program (e.g., a binary software component) and inferring the various functionalities without executing the program, and without analyzing the source code. Disassembling a binary software component can include translating the compiled or binary representation of the program into assembly language. In some cases, disassembling a binary software component includes identifying code blocks and data blocks in a binary software component. The binary static analysis of the software component can additionally include characterization of the software component based on information collected from the disassembly process.

DETAILED DESCRIPTION

Binary software components are collections of data representing low-level instructions (e.g., assembly language instructions) that can be executed by a processor. The instructions represented by such components may be defined by a set of high-level source code instructions written in a high level programming language, such as C, C++, JAVA, or other languages. A compiler program translates the set of high level source code instructions into the corresponding low-level instructions included in the binary software component. The high-level source code may include one or more functions, each including a set of instructions. The binary software component may include low-level instructions corresponding to the instructions of each function defined in the high-level source code.

Increasing complexity in a function defined in high-level source code can be associated with increasing instances of bugs and logic errors during execution of the function. In a binary software component compiled from high-level source code, the low-level instructions will generally mirror this complexity as they are a translation of the high-level source code.

Binary static analysis allows binary software components to be analyzed without referring to the high-level source code from which the binary software component was compiled. Binary static analysis is performed by examining the structure of the binary data making up the binary software component. Using these techniques, characteristics of the binary software component can be identified, including, but not limited to, functions defined in the program, application programming interfaces (APIs) used by the program, compiler defensive techniques implemented in the functions defined in the program, and other characteristics of the binary software component. Due to the general unavailability of corresponding high-level source code to users of binary software components, analyzing the complexity of a binary software component using binary static analysis would allow users to more easily evaluate the likelihood of bugs and logic errors occurring during execution of the binary software component.

The present disclosure describes techniques for identifying functions prone to logic errors in software components using binary static analysis. In one example method, a function defined within a binary software component is identified. The function may include one or more instructions. One or more complexity characteristics of the function are determined based on the included instructions. Based on these complexity characteristics, a determination is made whether the function is likely to produce errors when the instructions included in the function are executed by a processor. If the function is determined to likely contain errors, an indication that the function requires further review is generated. For each function identified in a binary software component, several data points can be used to determine whether a function is likely to contain errors. For example, a function that has a high ratio of conditional branches in comparison to an overall number of instructions may be determined to be likely to contain errors. Other data points to consider include, for example, data size for the function, overall size of the function, number of data references for the function, and number of calls to other functions included in the function. These points either alone or in conjunction with other points can be utilized and evaluated to determine whether a function is likely to contain errors, and is therefore an appropriate candidate for further analysis or examination. In some cases, the context or purpose of the function can also be taken into account in making this determination. Functions defined to have more important purposes can be determined to likely contain errors at lower levels of complexity, in order to trigger further review more often. For example, if a function is associated with encryption, then a code complexity threshold can be stricter in comparison to a function that is associated with object display.

Figure 1:
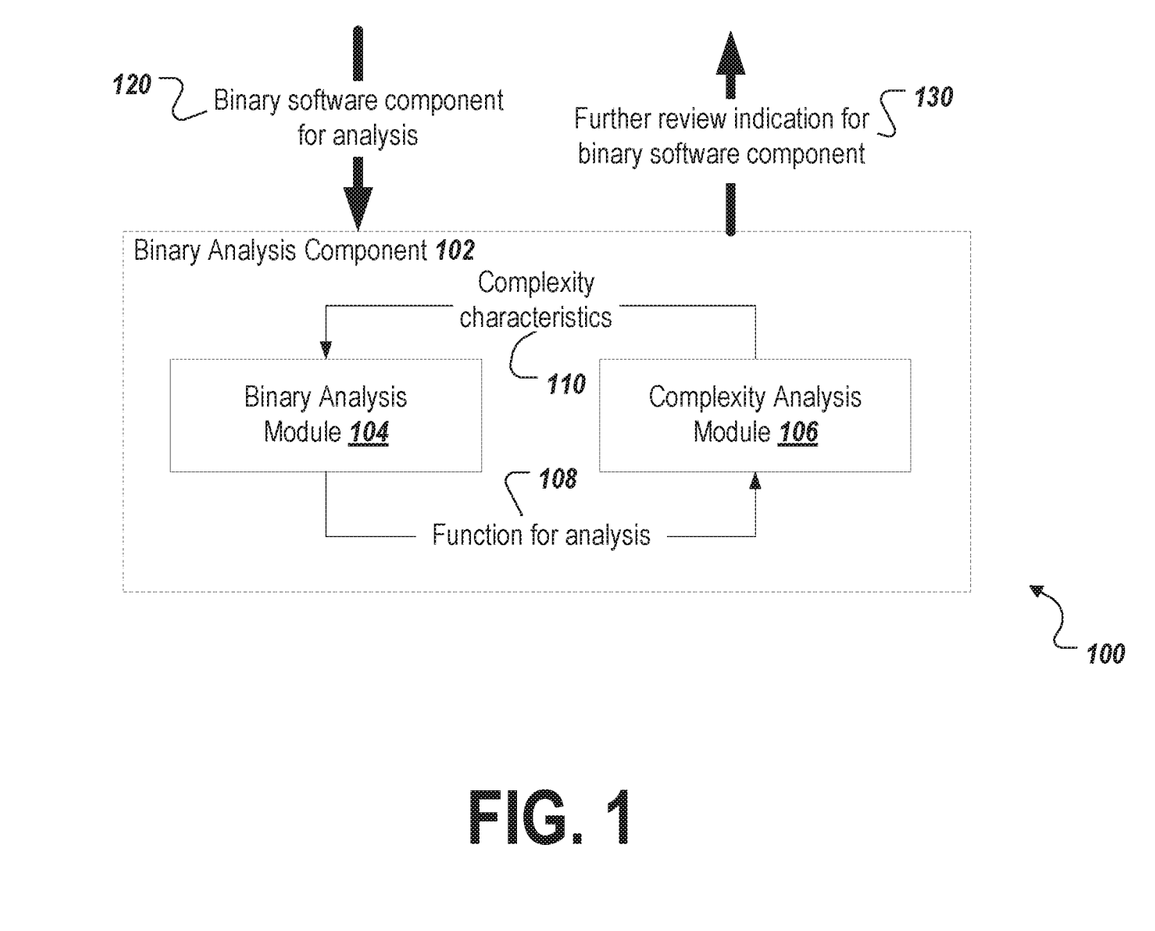
FIG. 1 is a schematic diagram showing a system that identifies functions prone to logic errors in a software component.
Figure 2:
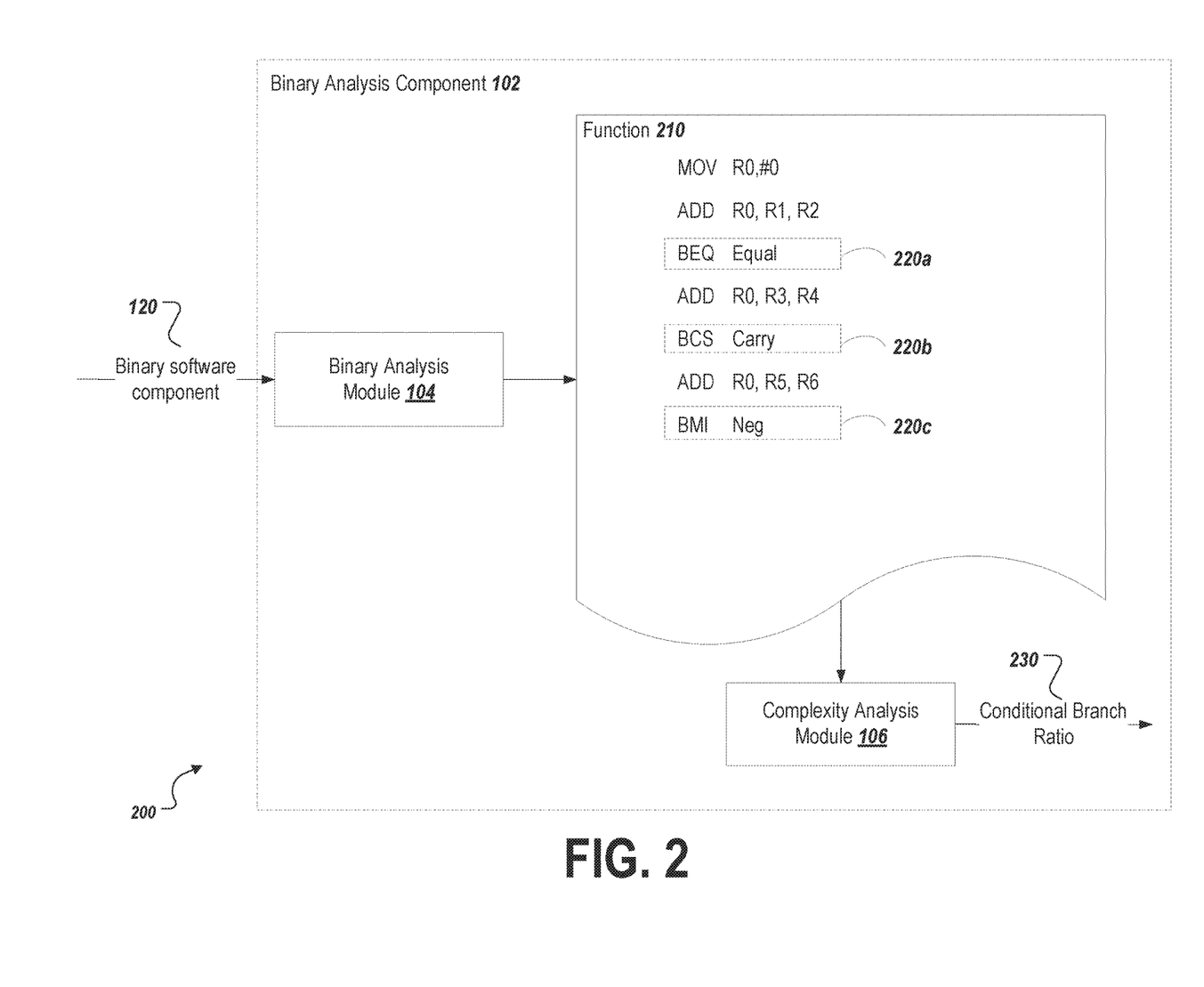
FIG. 2 is a schematic diagram showing a system processing a function to determine whether it is prone to logic errors.
Figure 3:
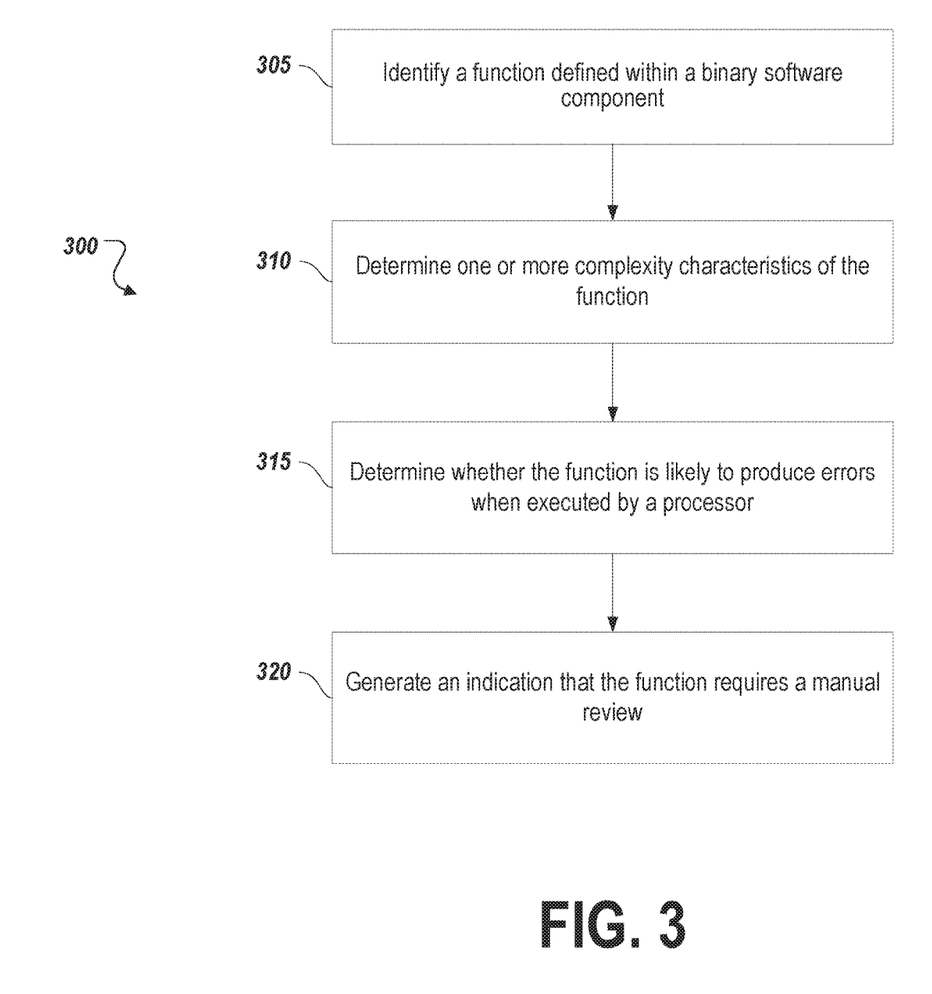
FIG. 3 is a flow diagram showing a method for identifying functions prone to logic errors in a software component.

FIGS. 1-3 and associated descriptions provide additional details of these implementations. These approaches provide a mechanism to allow functions prone to logic errors in binary software components to be identified using binary static analysis. The techniques described herein may allow such functions to be identified without reference to the high-level source code for the binary software component, which may be beneficial where a user of a binary software component does not have access to the high-level source code. Further, the techniques described herein may allow function complexity to be identified using relatively simple metrics, which may allow functions that likely include logic errors to be identified using reduced processing resources and processing time.

FIG. 1 is a schematic diagram showing a system 100 that identifies functions prone to logic errors in a binary software component. The system 100 includes a binary analysis component 102, which can include a binary analysis module 104 and a complexity analysis module 106. The binary analysis component 102 can include one or more computing devices executing software programs, such as the binary analysis module 104 and the complexity analysis module 106, to perform the binary static analysis of binary software components (120) and to generate indications for further review of the software components (130).

In an example operation, the binary analysis component 102 can receive a binary software component for analysis (120). In some cases, the binary software component can be received from a software build environment, a software deployment manager, a storage component, or other systems. For example, a software build environment may be configured to send a binary software component to the binary analysis component 102 after the binary software component is compiled. As described below, the binary analysis component 102 may analyze the binary software component to determine the complexity of code blocks in the binary software component, and provide an indication of whether the binary software component should be subject to further review (e.g., by a human or an additional automated system).

The binary analysis component 102 can perform binary static analysis on the binary software component. In some cases, this binary static analysis includes performing a disassembly of the binary software component to identify code blocks and data blocks included therein. In some cases, a code block identified by the binary analysis module 104 can be a function. As shown, the binary analysis module 104 may identify a function 108 in the received binary software component and pass the identified function 108 to the complexity analysis module 106 for analysis. The complexity analysis module 106 can analyze the identified function 108 to determine complexity characteristics 110 of the identified function 108. In some cases, the complexity analysis module 106 may receive and analyze all functions identified by the binary analysis module 104. The identified functions 108 may be passed to the complexity analysis module 106 individually (as shown), or multiple identified functions 108 may be passed at once.

The complexity analysis module 106 can analyze the identified function 108 and produce complexity characteristics 110 for the identified function 108 based on this analysis. Complexity characteristics 110 can include various metrics about the identified function 108 that are indicative of its complexity. For example, the complexity analysis module 106 may produce a conditional branch ratio for the identified function 108. Conditional branches are instructions in a program that can cause a processor to begin executing a different instruction sequence and deviate from a default behavior of executing instructions in sequential order. Conditional branches typically take the form of a conditional statement that captures an instruction sequence to be executed if a condition (or set of conditions) is satisfied. A conditional branch ratio is a ratio of conditional branches in a function in comparison to an overall number of instructions in the function. If a conditional branch ratio of a function exceeds a threshold conditional branch ratio (for example, 8%) then the function can be determined likely to produce errors. The threshold conditional branch ratio can be different based on the context or purpose of the function being analyzed. In other words, the threshold conditional branch ratio can be different for different functions. For example, the threshold conditional branch ratio for functions associated with encryption can be lower (such as 6%) in comparison to the threshold conditional branch ratio for functions associated with display (such as 10%)

In some cases, the threshold conditional branch ratio may be calculated relative to an average conditional branch ratio for all functions in a binary software component. In such a case, a function with a conditional branch ratio that is significantly above this average ratio can be flagged for further review. For example, if the average conditional branch ratio for all functions in a binary software component is 8%, the threshold conditional branch ratio may be set at 10% so that functions that with significantly more frequent conditional branches than the rest of the binary software component are flagged for further review.

Complexity characteristics 110 can also include, for example, a data size for the function, an overall size of the function, a number of data references for the function, a number of calls to other functions included in the function, or other characteristics. Like the conditional branch ratio described above, each of these complexity characteristics 110 may be computed by the complexity analysis module 106 based on its analysis of the identified function 108, and may be compared to a complexity threshold particular to the characteristic to determine whether it is indicative of sufficient complexity to warrant a further review of the binary software component.

In response to determining that the complexity characteristics 110 indicative of sufficient complexity to warrant a further review of the binary software component, the binary analysis component 102 may generate an indication for further review 130 for the identified function 108 based on the complexity characteristics 110 of the identified function 108. In some cases, the binary analysis component 102 may send the indication for further review (130) to the system that originally provided the binary software component for analysis (e.g., a software build environment, a software deployment manager, or other systems). In some cases, the binary analysis component 102 may generate a complexity map of the binary software component, with indications for further review for one or more functions in the binary software component.

FIG. 2 is a schematic diagram showing an example system 200 that analyzes a function 210 and generates a conditional branch ratio 230. As shown, the binary analysis module 104 may receive a binary software component 120, and may process the binary software component 120 to identify function 210 included in the binary software component 120. The binary analysis module 104 may pass the identified function 210 to the complexity analysis module 106. In the example shown in FIG. 2, the complexity analysis module 106 computes a conditional branch ratio 230 by analyzing the instructions included in the identified function 210. In some cases, the complexity analysis module 106 may compute other complexity characteristics based on the instructions included in the identified function 210, including, but not limited to, a data size for the function, an overall size of the function, a number of data references for the function, a number of calls to other functions included in the function, or other characteristics.

In some implementations, the complexity analysis module 106 may compute the conditional branch ratio 230 for the identified function 210 by identifying all conditional branch instructions in the identified function 210, and dividing the number of identified branch instructions by the total number of instructions in the function 210. For example, the instructions 220a, 220b, and 220c in the function 210 represent conditional branch instructions defined according to the ARM instructions set. Thus, because the function 210 includes three conditional branch instructions 220*a*, 220*b*, and 220*c*, and seven total instructions, the complexity analysis module would produce a conditional branch ratio of ~43% (3/7).

As described above, the conditional branch ratio 230 can then be compared against a threshold conditional branch ratio, such as 40% (or 0.4). In this example, because the conditional branch ratio 230 determined by the complexity analysis module 106 is higher than the threshold conditional branch ratio, the binary analysis component 102 may generate an indication that the function 210 requires a further review. If the conditional branch ratio 230 were lower than or equal to the threshold conditional branch ratio, the binary analysis component 102 may either not generate any indication or generate an indication that the function 210 does not necessitate further review.

FIG. 3 is a flow diagram showing a method 300 for identifying functions prone to logic errors in software components using binary static analysis. At 305, a function defined within a binary software component is identified. The function defined within the binary software component includes one or more instructions. The identification of the function can be performed by, for example, the binary analysis module 104 shown in FIG. 1.

At 310, one or more complexity characteristics of the function are determined based on the included instructions. Complexity characteristics can include a conditional branch ratio (as described previously), a data size for the function, an overall size of the function, a number of data references for the function, and a number of calls to other functions included in the function. The determination of the complexity characteristics can be performed by, for example, the complexity analysis module 106 shown in FIG. 1.

At 315, based on the complexity characteristics, it is determined whether the function is likely to produce errors when the instructions included in the function are executed by a processor. In some cases, determining whether the function is likely to produce errors when the instructions included in the function are executed by the processor includes comparing the conditional branch ratio to a threshold conditional branch ratio. If the conditional branch ratio is greater than the threshold conditional branch ratio, then it can be determined that the function is likely to produce errors.

At 320, an indication that the function requires further review is generated in response to determining that the function is likely to contain errors. The indication can optionally include the complexity characteristics determined at 310 to provide contextual information that can aid the further review. Some examples of subsequent further review of the binary software component include: determining whether the binary software component was compiled with security checks (that is, /GS or stack cookie protection), verifying whether the binary software component was built with software-enforced data execution prevention or Safe Exception Handlers (that is, /SafeSEH), and checking for use of an assembly protected by a digital signature (that is, strong-named assembly).

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service users using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described previously as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described previously should not be understood as requiring such separation or integration in all implementations, and it should be understood that the described program components and systems can, generally, be integrated together in a single software product or packaged into multiple software products.

Accordingly, the description of example implementations does not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
identifying a plurality of functions defined within a binary software component, each of the plurality of functions including one or more instructions;
determining one or more complexity characteristics of the each of the plurality of functions based on the included instructions, wherein determining the one or more complexity characteristics comprises determining a conditional branch ratio for a respective function by dividing a number of instructions included in the respective function by a number of instructions that are conditional branch instructions in the respective function;
determining an average conditional branch ratio based on the conditional branch ratio for each of the plurality of functions;
determining, based on the complexity characteristics, whether each of the plurality of functions is likely to produce errors when the instructions included in the function are executed by a processor, wherein whether each of the plurality of functions is determined to be likely to produce errors based, at least in part, on the conditional branch ratio of the respective function and the average conditional branch ratio of the plurality of functions; and
in response to determining that the function is likely to contain errors, generating an indication that the function requires further review.

2. The method of claim 1, wherein determining, based on the complexity characteristics, whether the respective function is likely to produce errors when the instructions included in the respective function are executed by a processor includes comparing the conditional branch ratio to a threshold conditional branch ratio, and determining that the respective function is likely to produce errors if the conditional branch ratio is greater than the threshold conditional branch ratio.

3. The method of claim 1, wherein the one or more complexity characteristics include a data size for the respective function.

4. The method of claim 1, wherein the one or more complexity characteristics include an overall size of the respective function.

5. The method of claim 1, wherein the one or more complexity characteristics include a number of data references for the respective function.

6. The method of claim 1, wherein the one or more complexity characteristics include a number of calls to other functions included in the respective function.

7. An electronic device comprising:
at least one hardware processor;
a non-transitory computer-readable storage medium coupled to the at least one hardware processor and storing programming instructions for execution by the at least one hardware processor, wherein the programming instructions, when executed, cause the at least one hardware processor to perform operations comprising:
identifying a plurality of functions defined within a binary software component, each of the plurality of functions including one or more instructions;
determining one or more complexity characteristics of the each of the plurality of functions based on the included instructions, wherein determining the one or more complexity characteristics comprises determining a conditional branch ratio for a respective function by dividing a number of instructions included in the respective function by a number of instructions that are conditional branch instructions in the respective function;

determining an average conditional branch ratio based on the conditional branch ratio for each of the plurality of functions;

determining, based on the complexity characteristics, whether each of the plurality of functions is likely to produce errors when the instructions included in the function are executed by the at least one hardware processor, wherein whether each of the plurality of functions is determined to be likely to produce errors based, at least in part, on the conditional branch ratio of the respective function and the average conditional branch ratio of the plurality of functions; and in response to determining that the function is likely to contain errors, generating an indication that the function requires further review.

8. The electronic device of claim 7, wherein determining, based on the complexity characteristics, whether the respective function is likely to produce errors when the instructions included in the respective function are executed by a processor includes comparing the conditional branch ratio to a threshold conditional branch ratio, and determining that the respective function is likely to produce errors if the conditional branch ratio is greater than the threshold conditional branch ratio.

9. The electronic device of claim 7, wherein the one or more complexity characteristics include a data size for the respective function.

10. The electronic device of claim 7, wherein the one or more complexity characteristics include an overall size of the respective function.

11. The electronic device of claim 7, wherein the one or more complexity characteristics include a number of data references for the respective function.

12. The electronic device of claim 7, wherein the one or more complexity characteristics include a number of calls to other functions included in the respective function.

13. One or more non-transitory computer-readable media containing instructions which, when executed, cause an electronic device to perform operations comprising:

identifying a plurality of functions defined within a binary software component, each of the plurality of functions including one or more instructions;

determining one or more complexity characteristics of the each of the plurality of functions based on the included instructions, wherein determining the one or more complexity characteristics comprises determining a conditional branch ratio for a respective function by dividing a number of instructions included in the respective function by a number of instructions that are conditional branch instructions in the respective function;

determining an average conditional branch ratio based on the conditional branch ratio for each of the plurality of functions;

determining, based on the complexity characteristics, whether each of the plurality of functions is likely to produce errors when the instructions included in the function are executed by a processor, wherein whether each of the plurality of functions is determined to be likely to produce errors based, at least in part, on the conditional branch ratio of the respective function and the average conditional branch ratio of the plurality of functions; and in response to determining that the function is likely to contain errors, generating an indication that the function requires further review.

14. The one or more non-transitory computer-readable media of claim 13, wherein determining, based on the complexity characteristics, whether the respective function is likely to produce errors when the instructions included in the respective function are executed by a processor includes comparing the conditional branch ratio to a threshold conditional branch ratio, and determining that the respective function is likely to produce errors if the conditional branch ratio is greater than the threshold conditional branch ratio.

15. The one or more non-transitory computer-readable media of claim 13, wherein the one or more complexity characteristics include a data size for the respective function.

16. The one or more non-transitory computer-readable media of claim 13, wherein the one or more complexity characteristics include an overall size of the respective function.

17. The one or more non-transitory computer-readable media of claim 13, wherein the one or more complexity characteristics include a number of data references for the respective function.

* * * * *